Figure 1:
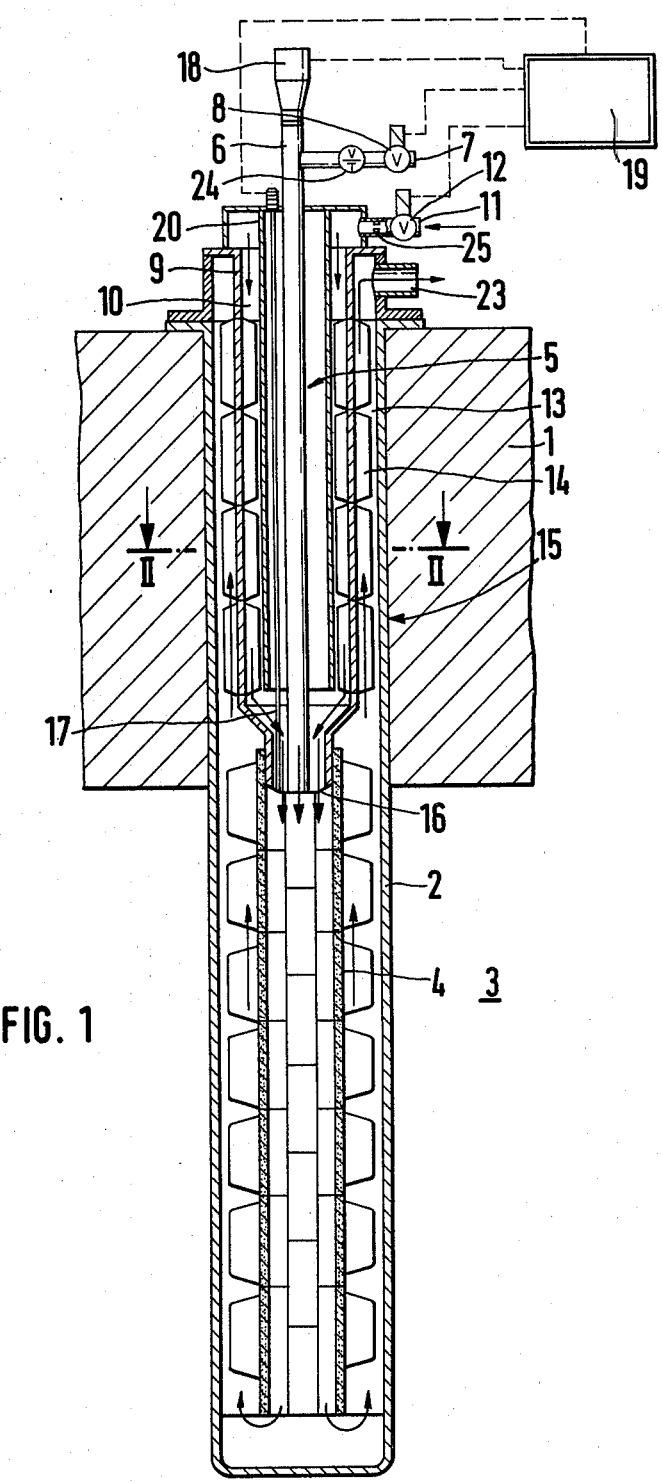

United States Patent [19]

Wunning

[11] 4,298,333

[45] Nov. 3, 1981

[54] INDUSTRIAL HEATING INSTALLATION AND METHOD OF OPERATION

[75] Inventor: Joachim Wunning, Leonberg, Fed. Rep. of Germany

[73] Assignee: J. Aichelin, Korntal b. Stuttgart, Fed. Rep. of Germany

[21] Appl. No.: 941,263

[22] Filed: Sep. 11, 1978

[30] Foreign Application Priority Data

Sep. 19, 1977 [DE] Fed. Rep. of Germany ....... 2742070

[51] Int. Cl.³ .......................................... F23D 11/44
[52] U.S. Cl. .................................... 431/11; 431/166; 431/215
[58] Field of Search ................. 431/11, 166, 215, 216, 431/242

[56] References Cited

U.S. PATENT DOCUMENTS

| | | | |
|---|---|---|---|
| 1,987,401 | 1/1935 | Hillhouse | 431/11 |
| 2,735,481 | 2/1956 | Reichhelm | 431/242 |
| 2,902,270 | 9/1959 | Salomonsson | 431/215 |
| 3,163,202 | 12/1964 | Schmidt | 431/166 |
| 3,285,240 | 11/1966 | Schmidt | 431/215 |
| 3,695,816 | 10/1972 | Oeppen | 431/215 |
| 4,038,022 | 7/1977 | Blackman | 431/215 |

*Primary Examiner*—George E. Lowrance
*Attorney, Agent, or Firm*—Frishauf, Holtz, Goodman & Woodward

[57] ABSTRACT

A burner is connected to a fuel line and to an air supply line. A countercurrent recuperator is attached to the burner for providing heat exchange between the supply air and the exhaust gases. The recuperator has a frictional flow resistance to the exhaust gases and the supply air resulting in a pressure differential between entrance and exit of supply air, which is highly temperature dependent. This pressure differential is employed for self-controlling the relative supply air flow to the burner at different operating temperatures.

15 Claims, 2 Drawing Figures

INDUSTRIAL HEATING INSTALLATION AND METHOD OF OPERATION

The invention relates to an industrial heating installation for gas and liquid fuels for heating industrial furnaces or ovens employing a recuperator providing heat exchange between the supply air and the exhaust gases.

BACKGROUND AND PRIOR ART

Industrial burners operated with liquid or gas type fuels are employed for the heating of industrial furnaces or ovens and such burners in general result in large heat losses being carried away by the hot exhaust gases. Increasing fuel costs provide incentives to recapture the heat carried by the exhaust gases. As disclosed in German Published Patent Application DT-AS No. 1232 304, a recuperator can be built directly into the burner. The supply air and the hot exhaust gases pass the recuperator in a countercurrent resulting in an increase in temperature of the supply air by heat exchange. The recuperator employed can be of the longitudinal fin tube type recuperator. In this type of recuperator the fins are located in a hollow first cylinder formed by the burner tube and by the tube for supplying air to the burner and in a second hollow cylinder formed by the supply air tube and by the exhaust gas tube.

Burners with open construction employed for directly heated ovens or furnaces have also been provided with a recuperative air preheater as disclosed in U.S. Pat. No. 3,163,202, SCHMIDT et al, to which German Published Patent Application DT-AS No. 1 229 226 corresponds. In this case the longitudinal fin recuperator is constructed together with the burner as one unit. The exhaust tube merges axially in the plane at the burner tip into the oven and a suction device for the exhaust gas controllable independence on the air supply, is placed at the output end of the exhaust tube. These burners work with a continuous fuel and air supply. A steady mixing control is provided for adapting the heat generation of the burner to the momentary heat need of the oven or furnace. It is difficult to control this over a wide range and to provide the burner in maximum position with limited noise generation and correspondingly low output gas velocity and alternatively at minimum position to provide sufficient mixing capability for soot-free combustion. It is known to alleviate this problem by operating an industrial burner with a recuperatively preheated air supply with an on-off controller, i.e., a two-point controller for running the burner for short ON-times with full power and then shutting the burner OFF in between. (See Publication "Gas-Heat International", 25 (1976) Issue 11, 12, pages 577–80). Such operation necessitates a reliable ignition guaranteeing problem-free re-ignition of the burner after each OFF-time. The recuperators of all these burners are constructed for providing a relatively small pressure drop along the recuperator on both the side of the supply air and the side of the exhaust gas and such pressure drop is generally much below about 10 mbar. The air supply and exhaust gas channels in the recuperator consequently are built with relatively large diameters. Since the pressure drop in the recuperator is dependent on the operating temperature and on the manufacturing tolerances, there is a tendency to minimize the pressure drop occuring in the recuperator versus the pressure drop occuring at the control valve placed in the air supply line in order to keep the amount of air supplied independent from the recuperator temperature, resulting in a nearly constant relative amount of air and fuel in the burner over the whole temperature range covered. Typically, there is about an 1:5 relation for the pressure drop in the recuperator versus the pressure drop in the air control valve, or throttle. It is a general opinion in the industry that the danger of clogging of a recuperator with narrower supply air and exhaust gas channels and having a higher pressure drop cannot be controlled. The technical efficiency $\eta$ of such burners operating with recuperative preheating is below about 0.7 for an exhaust gas temperature of about 1000° C.

The flame temperature increases with increasing preheating of the supply air in the recuperator resulting in a larger nitrogen oxide ($NO_x$) part in the exhaust gases. A nearly stoichiometric mixture of fuel and air is desirable to counteract a formation of nitrogen oxides. This means that when the recuperator is operating at cold or low temperatures such as when starting or at low temperature operation, considerable soot and carbon monoxide formation has to be tolerated. Therefore, the channels in conventional recuperators have been of rather large diameter.

THE INVENTION

It is an object to improve an industrial heating installation without considerable additional material expenditure for better adaptation to environmental non-pollution requirements and to provide considerably higher heating efficiency.

Briefly, a heating installation for heating of industrial ovens or furnaces has a burner connected to a fuel line and to an air supply line and a recuperator attached to the burner providing for countercurrent heat exchange of supply air and exhaust gases. The recuperator provides for pronounced flow resistance, opposing the flow of the supply air and resulting in a pressure differential of the supply air between their entrance into and its exit from the recuperator. This in turn leads to a decrease in the air supply to the burner at higher temperatures. Preferably, the recuperator is a longitudinal fin recuperator and the heat provided by the installation is adjusted by an on-off controller of the burner. The term "pronounced flow resistance" as used herein means a deliberately introduced flow resistance due to the structural arrangement of the apparatus and to distinguish from flow resistance of tubing or duct work guiding controlled air flow.

The heating installation is characterized by so arranging the flow resistance of the supply air that automatic adjustment of the fuel supply air ratio is obtained using the temperature dependent frictional resistance of the supply air going through the recuperator. The fuel frictional resistance is nearly temperature independent of the fuel supply feed lines to the burner. The ratio of fuel-to-air supply between a warm state under operating conditions and the cold state is adjustable by about at least 10 percent.

The present invention uses the considerable increase of the kinematic viscosity of gases with temperature, e.g., when increasing the average operating temperature of the recuperator to about 400° C. then the kinematic viscosity of the correspondingly heated gases increases the frictional resistance of the recuperator to about a fourfold value compared with the cold state.

The new heating installation employs this effect intentionally in such a way that a large part of the pressure losses in the heating installation, which generally occurs in the control valve of the air supply line, is now placed in the recuperator providing a high frictional flow resistance by way of the dimensional construction of the passage channels. One result of this is an increased effectiveness of the heat transfer in a recuperator of the same size, but with an increased gas stream velocity. Secondly, the air flow into the burner is considerably affected by the high frictional resistance of the recuperator compared to other locations of pressure drop in the system resulting in an automatic control mechanism of the mixture ratio of fuel and air supply through the frictional resistance of the recuperator changing in dependence on temperature.

This leads to the advantage that carbon monoxide and soot formations are essentially eliminated when starting the burner at relatively cold temperatures or when operating at relatively low temperatures. Furthermore, at higher operating conditions, there are employed nearly stochiometric air and fuel amounts resulting in flame conditions forming only a substantially decreased amount of nitrogen oxides ($NO_x$). Therefore, the fuel-air supply ratio automatically adapts to the furnace temperature. Since at lower temperatures, the influence of an increasing air supply excess upon the heating efficiency continuously decreases, there is always assured on economic operation over the full operating range.

In order to compensate for manufacturing tolerances which affect the pressure drop in the recuperator, the air control valve in the air supply line is to be set for the proper air supply. For practical situations it is advantageous having the recuperator constructed such as to provide, under fully loaded operating conditions, a pressure drop of at least about 10 mbar on the supply air side, in some cases this pressure drop can be more than about 20 mbar.

Practical experience has shown that such pressure drop in the recuperator is sufficient compared with other flow impedances in the heating installation under usual operating conditions as to assure a safe adjustment of the mixture.

Preferably, the recuperator is constructed as a longitudinal fin recuperator wherein the clear fin distance on the side of the air supply is in the order of less than about 5 mm and on the exhaust gas side in the order of less than about 8 mm. Such clear distances are surprisingly small compared with those of conventional recuperators for burners. The prejudice against clogging of recuperators with relatively high frictional resistance existing in the industry have been found to be unsupported in the present case, since the excess air at lower temperatures reliably avoids the formation of soot. Minimum dimensions are determined by air and gas flow, noise, structural and economic considerations, as well known in fluid flow technology. Preferably, the burner is operated with on-off controls so that the ON-phase can last less than about 60 seconds. These relatively short fire pulses having their time sequence determined by the heat amount to be produced by the installation results in an optimal situation as to the operation of the burner and as to the heat distribution. In addition, the supply air can pass through the recuperator even at times when the burner is OFF for achieving a more uniform distribution of the heat generated, since the air is preheated in the hot recuperator. In an oven installation with open burners, a vigorous exhaust gas flow in the oven space will result, caused by the pulse stream and by the preheated air coming from the burner tip, providing for further equalizing of the temperature field and for improving the convective heat transfer, especially in low temperature ovens.

DRAWINGS

Figure 2:
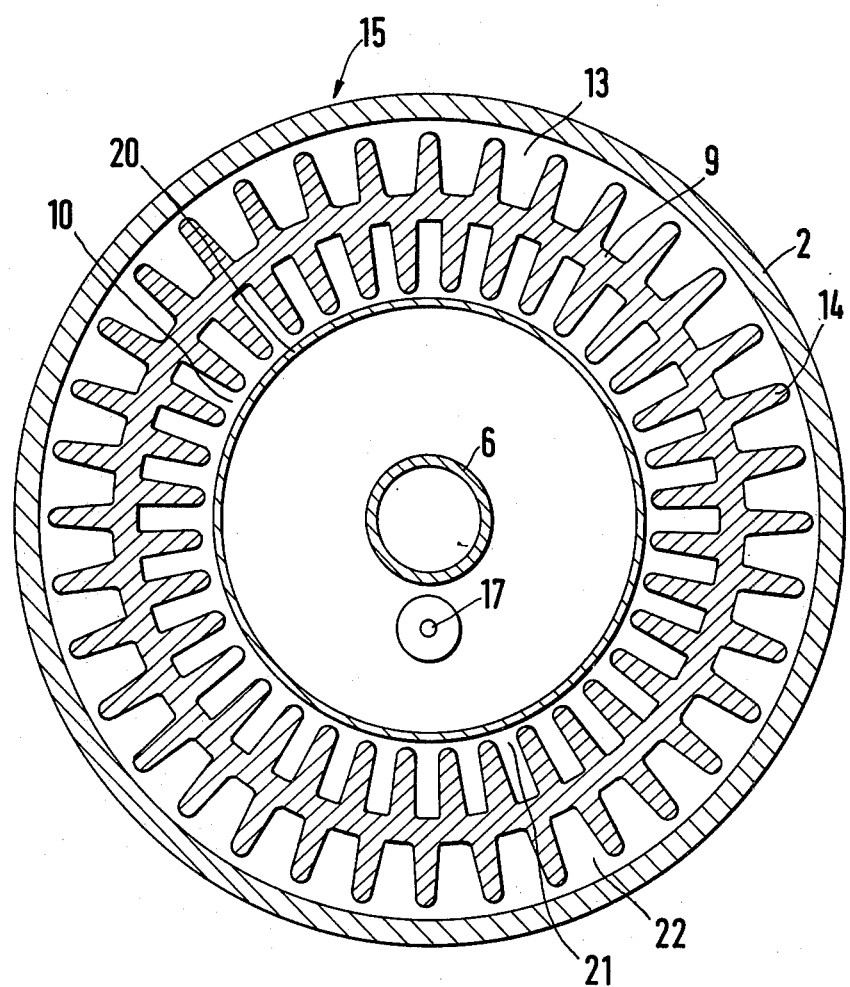

Drawings illustrating a preferred example:

FIG. 1 is a schematic axial cross-sectional view of the industrial heating installation of the present invention placed in a radiating shell tube; and FIG. 2 is a cross-sectional view of the industrial heating installation along section lines II—II of FIG. 1.

Referring now to FIG. 1, there is shown a heating installation positioned in a furnace wall 1. The radiating shell tube 2 is placed in an opening of the furnace wall 1 and protrudes into the furnace space 3. A flame tube 4 is positioned concentrically into the radiating shell tube 2. The flame tube 4 comprises individual ceramic elements and is therefore to some extent deflectable. The burner 5 proper is placed on the ceramic flame tube 4. A gas burner is shown in FIG. 1, which can be operated with gas fuels such as natural gas, coke-oven gas, propane and the like. A fuel supply tube 6 provides fuel to the burners 5. A fuel supply line 7, including a fuel flow control choke 24 and a magnetic valve 8, is connected into the fuel supply tube 6. The frictional resistance relative to the fuel flow of the magnetic valve 8 is negligibly small compared to the flow resistance of the fuel control choke or constriction 24. An air supply tube 9 is placed into the radiating shell tube 2 concentric to the fuel supply tube 6. The air supply tube 9 and an air guiding cylinder 20 confine a first concentric space 10 for supply air into which an air supply line 11 with a magnetic valve 12 merges. Between the air supply tube 9 and the radiating shell tube 2 is located a second concentric space 13. The exhaust gases flow through this space 13. The fins 14 of a longitudinal fin tube recuperator protrude into the concentric spaces 10 and 13. The recuperator 15 forms one unit with the burner 5; and the air supply tube 9 and the radiating shell tube 2 form parts of the recuperator. The air supply tube 9 has its diameter reduced at the burner tip 16 and is at this point introduced into the flame tube 4.

An ignition electrode 17 is placed within the air supply cylinder for generating an ignition spark close to the mouth 16 of the burners and sufficient to ignite the fuel-air mixture.

A flame control device 18 is placed on the top of the fuel supply line. Such device monitors, e.g., the ionization of the flame or the UV radiation emitted by the flame. The flame control device 18, the ignition electrode 17 and the magnetic valves 8 and 12 are connected to a controller 19.

Details of the construction of the recuperator 15 can be found in FIG. 1 and 2. The air supply tube 9 comprises individual ring parts. The fins 14 are unitary with the castings which protrude alternately into the concentric combustion gas space 13 and into the concentric supply air space of passage 10 (see FIG. 2). The number of the fins 14 is such as to provide a width of about 4 mm for the supply air channels 21 in the inner concentric space 10 and so as to provide a width of about 7 mm for the exhaust gas channels 22 in the outer concentric space 13. The diameter of the circle circumscribing the outer fin located in the concentric space 13 is about 13 cm and the diameter of the circle inscribed by the inner fins is about 7 cm. The nominal power of the burner is about 20 KW. The length of the recuperator 15 is about 40 cm and since there will be no soot formation, the exhaust gas channels 22 and in turn the supply air channels 21 can be constructed even more narrowly.

The ON-OFF control of the burner 5 in operation is provided by controller 19. The magnetic values 8 and 12 and the ignition electrode 17 are correspondingly controlled by the controller 19 such that the ON-phase lasts for less than about 60 seconds and that the OFF-phase lasts as long as necessary in view of the amount of heat required. The ignition of the ignition electrode occurs in immediate vicinity of the burner tip 16 and the flame control device 18 monitors the flame conditions through the fuel supply tube 6.

The hot exhaust gases of the short fire pulses from the burner orifice 16 flow through the flame tube 4 and are then upwardly redirected at the closed end of the radiating shell tube 2 as shown in FIG. 1. The exhaust gases flow through the exhaust gas channels 22 of the recuperator 15 and exchange their heat through the fins 14 and the air supply tube 9 with a countercurrent of the supply air passing through the supply air channels 21, and exhaust then through exhaust pipe 23. The dimensions of the exhaust gas channels 22 and of the supply air channels 21 are such as to provide in the recuperator 15 on the supply air side a pronounced pressure drop of at least about 10 mbar and preferably of more than 20 mbar resulting in a correspondingly high supply air velocity and exhaust gas velocity, respectively, in the supply air channels 21 and the exhaust gas channels 22, respectively. The high flow velocity yields also a correspondingly high heat transfer efficiency of the recuperator and thus an excellent use of the exhaust gas heat is assured.

The air supply line 11 includes a static plate or diaphragm 24 which, jointly with the fuel choke 24, controls a predetermined operation point for the burner 5 in the on-off mode. A properly adjusted burner 5 and a recuperator of the dimensions described above with a corresponding frictional resistance operate typically under the following pressure conditions:

| Supply air | cold | operating temperature |
| --- | --- | --- |
| Total pressure drop (mbar) | 50 | 50 |
| Pressure drop recuperator (mbar) | 5 | 18 |
| Pressure drop through air supply valve (mbar) | 45 | 32 |
| Ratio air/fuel | 1.17 | 1.00 |

This shows that the burner with a recuperator 15 heated to operating temperature employs a stochiometric mixture ratio, whereas initially, i.e., in the cold state an air excess of about 17 atomic percent is present. In addition, under operating conditions, the pressure drop at the recuperator 15 is of the same order of magnitude as the pressure drop at the supply air choke 24, whereas in the cold state, the pressure drop at the air supply choke by far outweighs that of the recuperator. The thermal efficiency $\eta$ of this burner at 1000° C. oven temperature is about 0.8.

The flow of supply air through the inlet air supply valve 12 is highly turbulent, so that the pressure drop at this point is dependent on the square of air speed. In the recuperator the flow is laminar so that the pressure drop and air speed relationship is linear. When, under hot or operating temperature conditions, the values of pressure drops at the inlet air supply valve 12 and to the recuperator are as given above then, the pressure drops will shift at a constant input pressure of 50 millibar in such a manner that the recuperator pressure drop will change so that the recuperator will only have five millibars whereas the pressure drop across the valve will be 45 millibars, when the system is in cold condition. This assumes that the input pressure is held constant so that, when the system is in operating temperature condition, about 20 to 50% of the entire pressure drop will occur at the recuperator.

While FIG. 1 shows the use of the burner 5 in a radiating shell heating tube, the burner can also be employed as mentioned above for directly heated ovens by disposal of the exhaust gases immediately into the oven or furnace space 3. It can be advantageous also in such a modification to supply air in the intervals between the fire pulses for continuous flow of the gases and for an improvement in the heat distribution. The incoming supply air is also, in this case, heated in the recuperator 15.

Various changes and modifications may be made within the scope of the inventive concept.

For optimum operating it is essential that the pressure drop across the recuperator is in the range of 20%-50% of the resultant pressure drop across the air supply valve and the recuperator. The pressure drop for the recuperator is defined as the pressure drop across the air-channels the pressure drop across the exhaust gas channels is in this connection ordinarily neglectable.

I claim:

1. A heating installation system for heating of industrial ovens or furnaces employing gaseous or liquid fuels comprising:

a fuel line (6, 7);
    a burner (5);
    means (8, 19) controlling fuel flow to the burner;
    fuel flow resistance control means (24) included in said fuel line (6, 7) and rendering the fuel flow through-put to the burner essentially temperature independent;
    an air supply line (11);
    means (12, 25) controlling air flow through the air supply line and causing a pressure drop in the air flow therethrough;
    the burner (5) being connected to the fuel line and to the air supply line;
    and a recuperator (15) having a supply air pressure (10) and being attached to the burner and providing for countercurrent heat exchange of supply air and of exhaust gases, said recuperator supply air passage being dimensioned and arranged to form an air throttle of choke having a pronounced frictional gas flow resistance opposing the flow of supply air therethrough resulting in a pressure differential between the ends of the recuperator which is a substantial portion of the total pressure drop of supply air through said air flow control means and said recuperator to the burner, said pressure differential increasing with temperature and thereby concurrently causing a decrease in the air supply to the burner and thus self-regulating the air-fuel ratio.

2. The installation as set forth in claim 1, wherein the recuperator structure provides a temperature vs. flow resistance characteristic to decrease in air supply to the burner at operating burner temperatures by at least about 10 percent with respect to cold, or non-combustion flow conditions.

3. The installation as set forth in claim 1, wherein the recuperator exhibits a frictional resistance to the flow of supply air at full operating temperature resulting in a pressure differential of at least 10 mbar.

4. The installation as set forth in claim 3, wherein the pressure differential is at least 20 mbar.

5. The installation as set forth in claim 1, wherein the recuperator is a longitudinal fin recuperator.

6. The installation as set forth in claim 5, wherein the longitudinal fin recuperator has a clear fin distance on the air supply side in the order of less than about 5 mm and on the exhaust gas side in the order of less than about 8 mm.

7. The installation as set forth in claim 1 further comprising an on-off controller regulating the fuel supply.

8. The installation as set forth in claim 7, wherein the ON-phase of the on-off control cycle lasts less than about 60 seconds.

9. The installation as set forth in claim 7, wherein the recuperator (15) continues to be fed with supply air during the OFF-phase of the control cycle.

10. A method for controlling the fuel-oxygen composition in a burner comprising:
providing air at essentially uniform pressure to a burner through a line having a first frictional air flow resistance;
providing fuel to the burner under essentially temperature-independent flow conditions;
mixing the fuel and the air;
igniting the fuel-air mixture and thus generating combustion gases for providing heat exchange with the supply air;
passing the resulting exhaust gas through a recuperator (15);
throttling or choking supply air flow through the recuperator by providing a pronounced frictional air flow resistance to said supply air, and causing a pressure drop which is a substantial portion of the total pressure drop to supply air through said line and said recuperator and providing for a higher frictional flow resistance at increased temperature than at starting temperature, and thereby reducing the amount of supply air provided to the burner with increasing temperature within the recuperator and self-regulating air flow to the burner with respect to the temperature.

11. The method as set forth in claim 10 further comprising;
controlling the fuel supply with an on-off controller.

12. The method as set forth in claim 11 further comprising:
continuing the flow of air through the recuperator during the OFF-time of the burner cycle.

13. The installation as set forth in claim 1, wherein the flow resistance to flow of supply air within the recuperator is large with respect to the flow resistance of the remainder of the air supply line.

14. The installation as set forth in claim 1, wherein at operating temperature the pressure drop across the recuperator is in the range of 20%–50% of the resultant pressure drop across the air flow control means and the recuperator.

15. The installation as set forth in claim 1, wherein the recuperator has a plurality of narrow heat exchange ducts having a temperature-flow resistance relationship of $$p = f(t)$$

wherein
p = maximum pressure drop, or differential of air flow through the recuperator, in millibars;
t = temperature in degrees C.;
and the function f is defined by about $20 \times t^{-1.5}$.

* * * * *

UNITED STATES PATENT AND TRADEMARK OFFICE
CERTIFICATE OF CORRECTION

PATENT NO. : 4,298,333
DATED : November 3, 1981
INVENTOR(S) : Joachim WUNNING

It is certified that error appears in the above—identified patent and that said Letters Patent is hereby corrected as shown below:

In the Claims: Claim 1, column 6, line 46; "....pressure" should be -- passage --

Claim 15, column 8, line 36, "....degrees C" should be -- degrees °C --

In DRAWINGS: column 4, line 45, "...of the burners" should be -- of the burner 5 -- column 4, line 58, "...of passage" should be -- or passage --

Signed and Sealed this

Sixteenth Day of February 1982

[SEAL]

Attest:

GERALD J. MOSSINGHOFF

*Attesting Officer*  *Commissioner of Patents and Trademarks*